May 8, 1923.  1,454,092
H. E. WARREN
SYSTEM OF ELECTRICALLY TRANSMITTING SIGNALS
Filed April 15, 1918   4 Sheets-Sheet 2

INVENTOR.
Henry E. Warren
BY Jas. H. Churchill
ATTORNEY.

May 8, 1923.

H. E. WARREN 1,454,092

SYSTEM OF ELECTRICALLY TRANSMITTING SIGNALS

Filed April 15, 1918    4 Sheets-Sheet 4

INVENTOR.
Henry E. Warren
BY Jas. H. Churchill
ATTORNEY.

Patented May 8, 1923.

1,454,092

UNITED STATES PATENT OFFICE.

HENRY E. WARREN, OF ASHLAND, MASSACHUSETTS, ASSIGNOR TO WARREN CLOCK COMPANY, OF ASHLAND, MASSACHUSETTS, A CORPORATION OF MAINE.

SYSTEM OF ELECTRICALLY TRANSMITTING SIGNALS.

Application filed April 15, 1918. Serial No. 228,632.

*To all whom it may concern:*

Be it known that I, HENRY E. WARREN, a citizen of the United States, and a resident of Ashland, in the county of Middlesex and State of Massachusetts, have invented an Improvement in Systems of Electrically Transmitting Signals, of which the following description, in connection with the accompanying drawings, is a specification, like characters on the drawings representing like parts.

This invention relates to a system for electrically transmitting signals, messages or like intelligence and to a novel apparatus for use in such system.

The invention among other uses is particularly well adapted to be employed on battleships and like vessels for range signaling and the like.

The invention further has for its object to provide a signaling system in which continuously operating electric motors may be employed.

In accordance with this invention, the system includes a plurality of apparatus or instruments of like construction in the main, and one of which is provided with means for controlling itself and the other apparatus, so that all the apparatus in the system may be simultaneously and automatically started from rest, stopped in any desired or predetermined position, started again and stopped in the same starting position.

To this end, each apparatus is provided with a rotatable member, and with an electrically operated device cooperating with said member to stop rotation thereof when in one position, to permit rotation thereof when in another position, and to stop rotation thereof when in a third position, and the master or controlling apparatus is provided with means for controlling the operation of the electrically operated devices of all the instruments. These and other features of the invention will be pointed out in the claims at the end of this specification.

Figure 1:
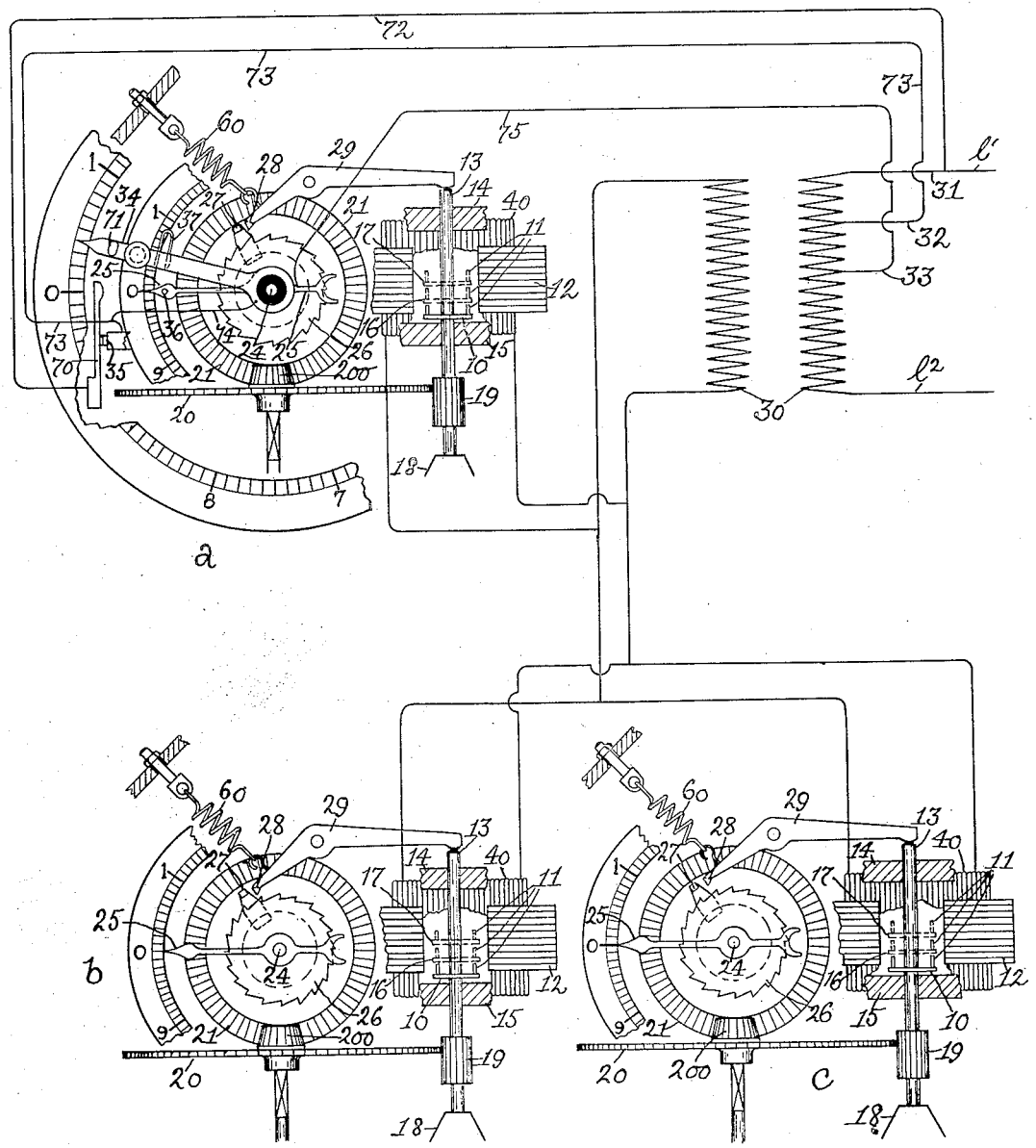

Fig. 1 represents in diagram a system embodying the invention and provided with a preferred form of apparatus.

Figure 2:
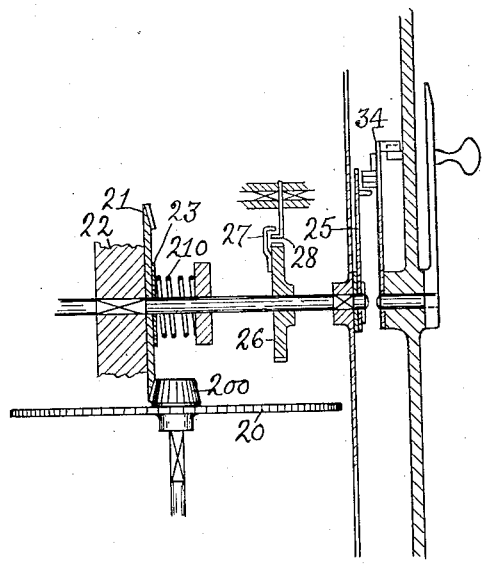

Fig. 2, a detail of the apparatus shown in Fig. 1.

Figure 3:
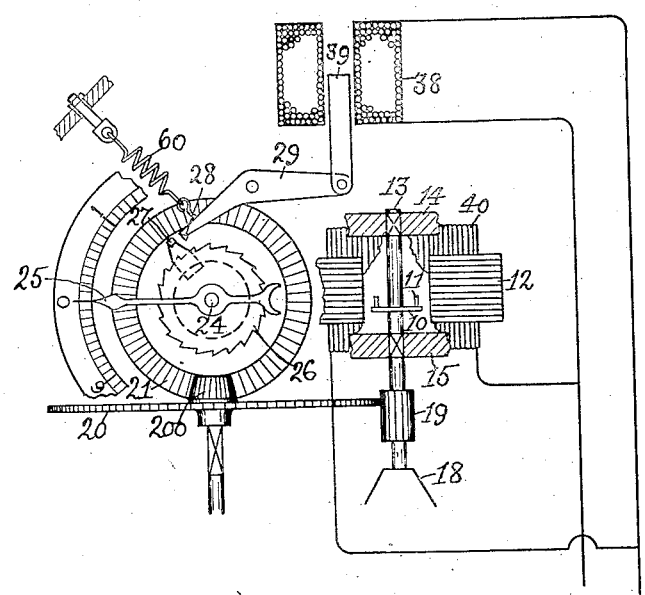

Fig. 3, a modified form of apparatus to be referred to.

Figure 4:
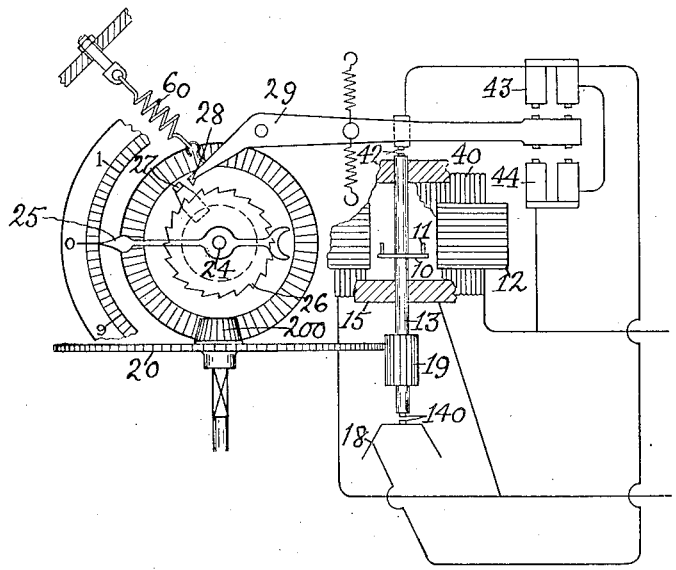

Fig. 4, a further modified form of apparatus.

Figure 6:
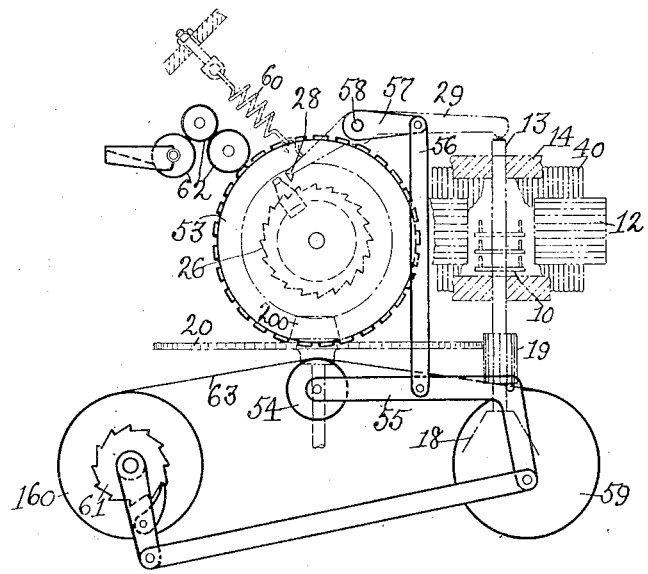
Figure 5:
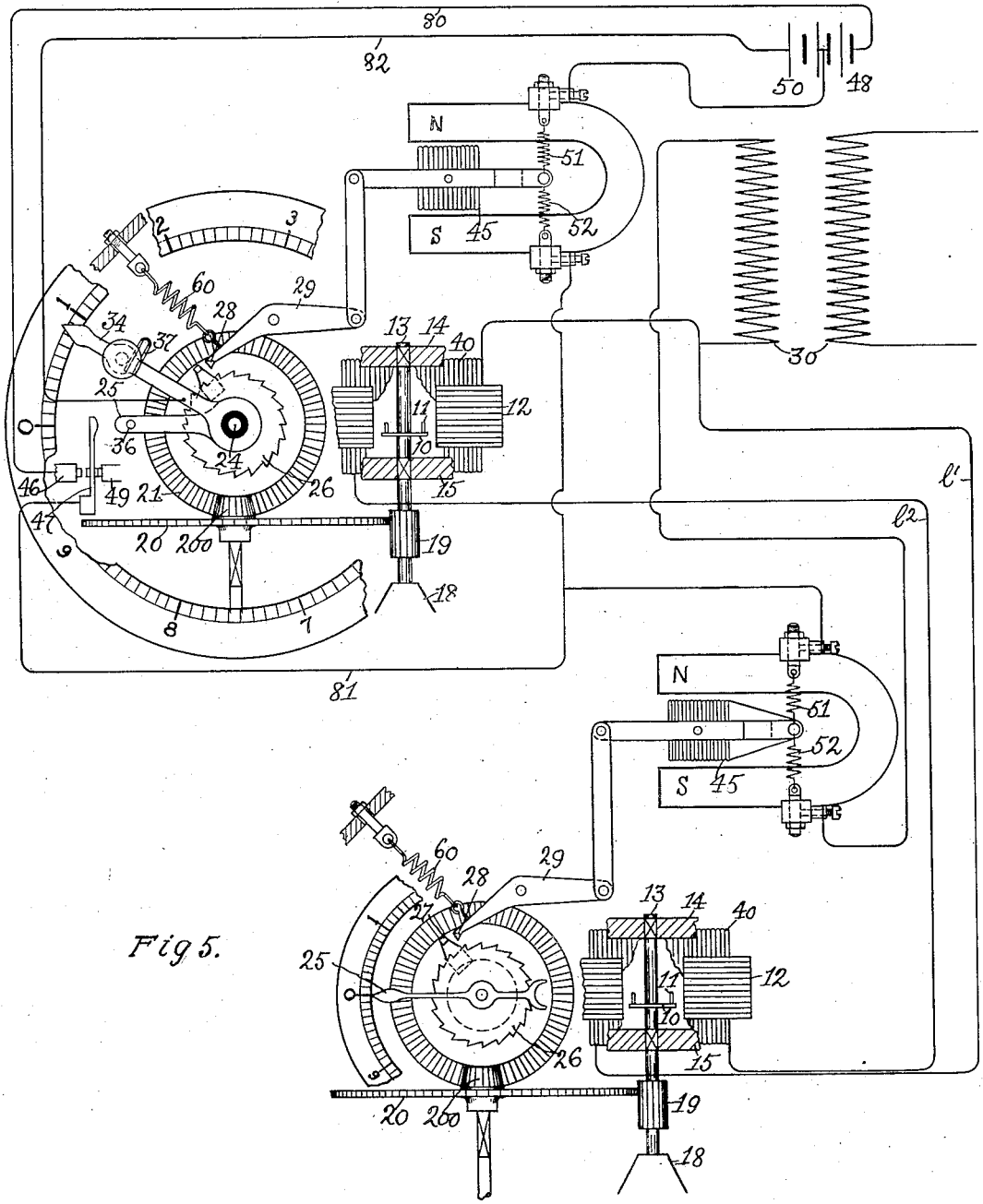

Fig. 5, a system like that shown in Fig. 1 with a further modified apparatus in which an alternating and a direct current are employed, and Fig. 6, a modified form of apparatus in which a printing mechanism is employed.

Referring to the drawings and particularly Figs. 1 and 2, I have shown the invention as embodied in an electrically operated system comprising three instruments or apparatus $a$, $b$ and $c$, which are of like construction in the main and one of which as $a$ is the master or controlling apparatus for the others in the system.

Inasmuch as the three apparatuses are of like construction a detailed description of one will suffice for all. Each apparatus is provided with a rotatable member which is herein shown as a shaft 24 having fast thereon an indicator or hand 25, and a ratchet wheel 26 having an arm 27 extended beyond the periphery thereof and constituting a stop arm, with which cooperates an electrically operated device for arresting rotation of the ratchet wheel 26, the shaft 24 and the indicator or hand 25.

The electrically operated device as shown in Figs. 1 to 5 is a lever 29 provided at its front end with a dog 28, which is designed in one position of said lever to engage the stop arm 27 and prevent rotation of the ratchet wheel 26 and shaft 24. The stop arm 27 extends beyond the ratchet wheel a sufficient distance to enable the dog 28 to be moved toward the ratchet wheel so as to clear the stop arm and allow the ratchet wheel to rotate freely. The dog 28 is also designed to be moved into engagement with the ratchet wheel 26 to arrest the same in selected or predetermined positions as will be described.

The ratchet wheel 26 and shaft 24 are motor driven, and it is preferred to use for this purpose a self-starting synchronous motor, preferably of the construction shown and described in another application Se. No. 138,763 filed by me on the 26th day of December 1916, and consisting of a rotor composed of a very light hardened steel disk 10 provided with hardened steel pins 11 projecting parallel with the shaft or axis 13 of the rotor which is almost encircled by the field 12, preferably consisting of a laminated electromagnet having shading coils or some equivalent phase-splitting device, so as to produce a rotating magnetic field from a single phase alternating current.

The shaft 13 revolves in bearings 14, 15, so that it may be moved vertically upward by magnetic force in opposition to the effect of gravity.

The position of the rotor, when no current is passing through the field 12, is below the horizontal center line of the field, and consequently the field 12, when magnetized, tends to lift the rotor toward the position shown by dotted lines in Fig. 1 and marked 17, and the extent of the lift will depend upon the magnetic strength of the current passing through the coil of the field 12. In a motor of this type, when the field is energized by a weak alternating current, synchronous speed will be reached and maintained by the rotor, even though the shaft 13 is not lifted away from the lower thrust bearing 18. With a stronger alternating current of the same frequency, the rotor and its shaft will be lifted slightly from the thrust bearing 18 so that the rotor will occupy the position marked 16, and with a still stronger alternating current, the rotor will tend to approach the position marked 17. Thus there may be three running positions. First, with the rotor down and its shaft resting upon the lower thrust bearing 18; second, the intermediate position 16, in which the shaft 13 is lifted slightly from the lower thrust bearing, and third, the position where the rotor is lifted nearly to the horizontal center line of the field magnet, which is position 17. The self-starting synchronous motor is employed to rotate the shaft 24, and ratchet wheel 26, and provision is made for intermittently rotating the shaft 24 and its attached parts by the continuously running synchronous motor.

In the present instance, the rotor shaft 13 is provided with a wide faced pinion 19, which meshes with and drives a gear 20, and bevel pinion 200, which latter drives a bevel gear 21, mounted loosely on the shaft 24 and adapted to be frictionally coupled thereto by friction disks 22, 23, on opposite sides thereof as shown in Fig. 2. The disk 22 is fast on the shaft 24 and the disk 23 is loose thereon and is pressed against the bevel gear 21 by a spring 210.

The bevel gear 21 is thus continuously driven by the synchronous motor, and the shaft 24 is rotated with the gear 21 when the dog 28 is disengaged from the stop arm 27 and from the ratchet wheel 26, that is, when the dog 28 occupies a position midway of the stop arm 27 and ratchet wheel 26. As shown in Fig. 1, movement of the lever 29 is controlled by the shaft 13 of the rotor 10, for which purpose the rear end of the lever 29 rests on the upper end of the rotor shaft 13, with which it is held in engagement by a spring 60.

When the rotor is in its lowermost position, the dog 28 projects into the path of the stop arm 27, so that under these conditions the indicator or hand 25 will always assume a fixed position. This position of the ratchet wheel 26, shaft 24 and hand 25 may be designated the zero or starting position, and while in this position, it will be understood that the rotor continues to revolve, because the friction disks 22, 23, slip on the faces of the gear 21. This arrangement permits any number of these instruments or apparatus to be synchronized, when the alternating current which drives the motors is weak or of low voltage.

The strength of the alternating current supplied to the synchronous motor may be varied as shown in Fig. 1, by means of a transformer 30 provided with three separate taps 31, 32, 33 on the primary side, each of which taps provides a different value of voltage.

Automatic switching means are so arranged on the master instrument $a$, that the current for the system may go to any one of the three taps of the transformer 30 according to the requirements at the time. If it is desired to rotate the indicators 25 from their zero or starting position, that is, with the dogs 28 in engagement with the stop arms 27, it is merely necessary to provide current to the tap 32 of the transformer, which current will lift the rotors into their intermediate vertical position 16, and thereby cause the rotor shafts 13 to move the levers 29 so as to disengage the dogs 28 from the stop arms 27, and bring the said dogs into a position midway of the stop arms 27 and their ratchet wheels 26, thus leaving the rotatable members of all the instruments free to be revolved by the motors.

These rotatable members, which in the present instance are the shafts 24, ratchet wheels 26 and indicators or hands 25, will now revolve in synchronism, by force transmitted from the gears 21 to the shafts 24 through the friction clutches or disks 22, 23. In order to arrest the rotatable members in any selected or predetermined position, the third or high voltage tap 33 of the transformer is connected with the primary circuit $l^1$ $l^2$, and instantly the dogs 28 of all of the instruments will be engaged with the ratchet wheels 26 with which they cooperate, so as to arrest rotation of the movable members of all the instruments simultaneously. The rotatable members of all the instruments will remain in their arrested position so long as the current is supplied to the tap 33 of the transformer. For sake of clearness, the hands 25 may be hereinafter referred to as the rotatable members of the instruments, and when it is desired to restore the hands 25 to their zero or starting position, the low voltage tap 31 of the transformer is substituted for the high voltage tap 33 and instantly the rotors 10 drop to their lowest position, thereby releasing the dogs 28 from the ratchet wheels 26 and restoring tl m to their starting position, in position to engage the stop arms 27 and arrest the ratchet wheels 26 and the hands 25 in their zero or starting position as soon as the ratchet wheels have been revolved into said starting or zero position.

It will be observed that the rotors 10 of all the instruments continue to revolve at synchronized speed during all of these various operations. If the current is now discontinued, the rotors 10 will stop, and the hands 25 will remain in their zero position, ready to start again whenever the current is turned on.

For the purpose of determining the instant when the current should be switched from one of the transformer taps to another, I have provided the master instrument $a$, with a manually operated circuit controlling member, which is herein shown as a rotatable arm or lever 34 mounted on the shaft 24 of said instrument so as to be capable of being moved by hand into any desired or selected position and to remain in such position until again manually moved. The rotatable arm or lever 34 in its zero position cooperates with a circuit controller which governs the taps 31, 32. In the present instance I have shown one form of circuit controller, which consists of a movable contact member 70 and a stationary member 35. The movable contact member 70 is adapted to be engaged by a projection 71 on the lever 34 when the latter is in its zero position, and forced back out of contact with the stationary member 35, thereby opening the circuit through the taps 32, 33 and leaving the tap 31 in circuit with the lines $l^1$ $l^2$.

Referring to Fig. 1, it will be seen that the contact member 70 is connected by wire 72 with the line wire $l^1$, and that the contact member 35 is connected by wire 73 with the tap 32, and is also connected by wire 74 with the lever 34.

When the lever 34 is engaged with the contact member 70, the circuits of the taps 32, 33, are open between the members 70, 35, while the circuit of the line is complete through the tap 31, thereby supplying low voltage or weak current to the synchronous motors of all the instruments. When it is desired to release the rotatable members or hands 25 of all the instruments and again arrest them in a selected or predetermined position, the lever or arm 34 of the master instrument $a$ is turned into the position desired or selected and left there. As soon as the arm 34 is swung away from its zero position, the circuit of the transformer tap 32 is closed and the hands 25 will start to rotate simultaneously. The circuit of the tap 33 is also closed at the contact members 70, 35, but is open between a contact member 36 on the hand 25 of the master instrument, and a contact member 37 on the lever or arm 35. The shaft 24 of the master instrument is connected by wire 75 with the tap 33, so that when the hand 25 of the master instrument in its rotation brings the contact member 36 into engagement with contact member 37, the circuit of the tap 33 is closed and the rotors of all the instruments will be lifted into their highest position 17, and the dogs 28 of all the instruments will be engaged with the ratchet wheels 26 so as to stop the indicators or hands 25 of all the instruments in the same position.

While it may be preferred to operate the lever 29 by axial movement of the rotor of the synchronous motor as above described and shown in Fig. 1, it is not desired to limit the invention in this respect, as said lever may be otherwise operated.

For instance, in Fig. 3, the lever 29 is operatively connected with the core 39 of a solenoid 38, which is connected in the same circuit with the magnetizing coil 40 of the synchronous motor, consequently the solenoid will be affected by change in the strength of the current flowing through the circuit and will act on the lever 29 and dog 28 in precisely the same manner as the shaft 13 of the axially movable rotor in Fig. 1.

Another modification for accomplishing the same result is shown in Fig. 4, wherein the rotor shaft 13 does not act directly upon the lever 29, but instead serves to close local circuits through the operating magnets 43 and 44 by means of contacts 42 and 140, so that the direct force to operate the lever 29 is not taken from the rotor shaft 13, although the vertical motion of the latter sets in action the necessary force to do the work.

A further modification of this invention, is shown in Fig. 5, wherein a direct current supplements an alternating current, the alternating current being used to operate the synchronous motors for bringing about motion of rotation, while the direct current acting upon a polarized motor 45 serves to operate the lever 29. The arrangement, wherein the direct current is supplied automatically to accomplish the desired result, is shown in Fig. 5, wherein the selecting or setting lever 34 of the master instrument is arranged to close circuit from 46 to 47 when the lever 34 is in its zero position. This will impose a current in one direction from the battery 48 upon the circuit for the line wires 80 and 81, and the current flowing in this direction will cause the polarized motor 45 to move the levers 29 so that the dogs 28 will engage the pins 27, thus, setting the indicators at zero. Movement of the lever 34 to any other position will close circuit between 47 and 49, permitting the direct current to travel into the indicating pointer 25, but not making a complete circuit from the battery 50. There will thus be no direct current flowing in 82 and 81, consequently, the motors 45 will permit levers 29 to assume their mid position, due to the springs 51 and 52, and the indicator 25 will commence to revolve because the alternating current is constantly flowing in lines $l^1$ and $l^2$ from the transformer 30. Then, as soon as contact pin 36 reaches contactor 37, the circuit will be closed from the battery 50, through the lines 82, 81, in such a direction as to cause the motors 45 to throw the dogs 28 into the ratchet wheels 26, and thus stop all indicators at the same point. Although Fig. 5 shows separate circuits for the direct and alternating current respectively, both of these currents may be carried through the same circuit and they will act selectively upon their respective motors.

Fig. 6 shows an adaptation of the invention to a printing telegraph, where the type wheel 53 takes the place of the indicator or hand 25. A pressure roller 54 is carried by the lever 55, attached by link 56 and lever 57 to the rocker shaft 58 upon which is mounted the lever 29. The paper is fed from the drum 59 to the takeup roller 160, which is intermittently moved by the ratchet wheel 61.

The type wheel 53 is inked by the rollers 62. Every time the type wheel 53 is stopped in a selected or predetermined position by the dog 28 engaging the ratchet wheel 26, the roller 54 will simultaneously bring the paper against one of the letters of the type wheel. When the dog 28 is returned to its starting position in the path of the stop arm 27, the paper will be removed from the type wheel 53 so that the latter will be free to revolve or to stop in its zero position for synchronizing purposes. In the arrangement shown in Fig. 6, the lever 29 is moved by the shaft 13 of the rotor as above described with reference to Fig. 1.

Although in this invention I prefer to use alternating current for operating motors of the instruments, and I prefer that these should be synchronous motors, it is not necessary that this should be the case. Motors may be of the induction type, running at less than synchronous speed, because the indicators of the instruments are constantly being synchronized in their zero position. The motors may even be direct current machines, without affecting seriously the performance even in the case of the form shown in Fig. 5, because in that case the direct current may be supplied to the rotating motors and the alternating current to the oscillating motors which operate the lever 29. These oscillating motors however would not be of the polarized variety, but would preferably be simple solenoids, such as shown in Fig. 3. If direct current motors were used in place of the synchronous alternating current motors, as shown in Fig. 1, commutators would, of course, be required. But the armatures, if suitably mounted, would have the same axial motion with respect to current strength, so that the action would be the same, although on account of the greater weight of the armatures, they would be slower in responding and probably less desirable.

Claims—

1. In a telegraphing system, constantly rotating motors, indicators driven therefrom, and stops for said indicators responsive to variations in the strength or electromotive force of the current which supplies the motors.

2. In a telegraphing system, constantly rotating motors having rotors capable of axial motion, indicators driven frictionally therefrom, and means for stopping said indicators without stopping the rotation of said motors controlled by axial motion of the rotating members of the motors.

3. In a telegraphing system synchronous motors supplied by alternating current, means for varying the strength or voltage of said alternating current, and means for synchronizing said indicators and also stopping them in different corresponding positions, said means being actuated by the variation in the strength or voltage of the alternating current.

4. In a signaling system, in combination, a rotatable member, means for rotating it, an electrically operated device movable into different positions and cooperating with the rotatable member to stop rotation thereof when in one position, to permit rotation thereof when in another position, and to stop rotation thereof when in a third position, and a circuit controlling device for said electrically operated device, comprising two members, one of which is capable of being moved into a selected or predetermined position and the other of which is automatically moved with said rotatable device to engage the first mentioned member and effect the operation of the electrically operated device to cause the latter to arrest the rotatable member in a selected or predetermined position.

5. In a signaling system, in combination, a rotatable member, means for rotating it, an electrically operated device movable into different positions and cooperating with the rotatable member to stop rotation thereof mechanically when in one position, to permit rotation thereof when in another position, and to stop rotation thereof mechanically when in a third position, and means for controlling the operation of said electrically operated device.

6. In a signaling system, in combination, a rotatable ratchet wheel provided with a stop arm extended beyond the periphery thereof, means for rotating said ratchet wheel, an electrically operated device cooperating with said stop arm to arrest rotation of said ratchet wheel, and movable out of engagement with said stop arm to permit rotation of said ratchet wheel, and further movable into engagement with said ratchet wheel to arrest rotation thereof, and means for controlling the movements of said electrically operated device.

7. In a signaling system, in combination, a rotatable member, an electric motor, means for connecting said rotatable member with said electric motor and having provision for permitting said motor to run without rotating said rotatable member, and an electrically operated device cooperating with said rotatable member to arrest rotation thereof when said device is in either of two positions and to permit rotation of said rotatable member when said electrically operated device is in a third position.

8. In a signaling system, in combination, a rotatable member, an electric motor, means for connecting said rotatable member with said electric motor and having provision for permitting said motor to run without rotating said rotatable member, and a device under the control of said motor for arresting rotation of said rotatable member when said device is in either of two positions and for permitting rotation of said member when said device is in an intermediate position.

9. In a signaling system, in combination, a plurality of apparatus, each comprising a rotatable member, a motor for rotating it, an electrically operated device cooperating with said rotatable device and movable into different positions to arrest rotation of said rotatable member when in either of two positions and to permit rotation thereof when in an intermediate position, and a selective device on one of said apparatus governing the operation of the electrically operated devices of all the apparatus to arrest the rotatable members of all the apparatus simultaneously in a selected position.

In testimony whereof, I have signed my name to this specification.

HENRY E. WARREN.